United States Patent
Coogan et al.

(10) Patent No.: US 11,124,413 B2
(45) Date of Patent: Sep. 21, 2021

(54) GASEOUS OXYGEN PROPULSION SYSTEM WITH CHEMICAL OXYGEN GENERATION

(71) Applicant: Southwest Research Institute, San Antonio, TX (US)

(72) Inventors: Shane Bucy Coogan, Allen, TX (US); Michael A. Miller, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 590 days.

(21) Appl. No.: 15/870,395

(22) Filed: Jan. 12, 2018

(65) Prior Publication Data

US 2019/0218095 A1    Jul. 18, 2019

(51) Int. Cl.
    *C01B 13/02*     (2006.01)
    *C06D 5/04*     (2006.01)
    *C06B 29/02*     (2006.01)

(52) U.S. Cl.
    CPC ...... *C01B 13/0218* (2013.01); *C01B 13/0203* (2013.01); *C01B 13/0211* (2013.01); *C06B 29/02* (2013.01); *C06D 5/04* (2013.01)

(58) Field of Classification Search
None
See application file for complete search history.

(56) References Cited

U.S. PATENT DOCUMENTS

| | | | |
|---|---|---|---|
| 3,293,187 A * | 12/1966 | Markowitz | ......... C01B 13/0211 252/186.22 |
| 3,708,357 A | 1/1973 | Morrow | |
| 5,474,625 A | 12/1995 | Duong et al. | |
| 6,866,794 B1 * | 3/2005 | Zhang | ................. C01B 13/0211 252/186.21 |
| 2005/0053527 A1 * | 3/2005 | Zharkov | ................ B01D 53/62 422/122 |
| 2005/0260468 A1 | 11/2005 | Fripp et al. | |
| 2006/0272754 A1 | 12/2006 | Dixon et al. | |
| 2017/0107107 A1 * | 4/2017 | Kallfass | ............... C01B 13/0296 |

FOREIGN PATENT DOCUMENTS

WO    2005117187 A2    12/2005

OTHER PUBLICATIONS

Jens, E., et al., "Design of a Hybride CubeSat Orbit Insertion Motor," 52nd AIAA/SAE/ASEE Joint Propulsion Conference, 2016, 5 pages.
National Fire Protection Association, Code for Storage of Liquid and Solid Oxidizers, NFPA 430, 2000, 3 pages.
Valujet Airlines Flight 592 Aircraft Accident Report, NTSB/AAR-97/06, National Transportation Safety Board, Washington, D.C., 1997, 271 pages.
Markowitz, M., et al, "The Decomposition Kinetics of Lithium Perchlorate"; The Journal of Physical Chemistry (ACS Publications). Abstract Only h<<ttps://pubs.acs.org/doi/pdf/10.1021/j100826a034>> accessed Dec. 12, 2018.

* cited by examiner

*Primary Examiner* — Aileen B Felton
(74) *Attorney, Agent, or Firm* — Grossman, Tucker, Perreault & Pfleger, PLLC

(57) ABSTRACT

The present invention relates generally in gaseous oxygen propulsion systems with solid-phase chemical oxygen generation for in-space propulsion systems. Chemical oxygen generation is provided by alkali metal chlorates, alkali metal perchlorates or metal peroxides.

14 Claims, 5 Drawing Sheets

GASEOUS OXYGEN PROPULSION SYSTEM WITH CHEMICAL OXYGEN GENERATION

GOVERNMENT RIGHTS CLAUSE

This invention was made with government support under Prime Contract No. NNN12AA01C awarded by National Aeronautics and Space Administration. The government has certain rights in the invention.

FIELD

The present invention relates generally in gaseous oxygen propulsion systems with solid-phase chemical oxygen generation for in-space propulsion systems. Chemical oxygen generation is provided by alkali metal chlorates, alkali metal perchlorates or metal peroxides.

BACKGROUND

Gaseous oxygen (GOX) is a strong oxidizer with applicability to chemical space propulsion systems because of its high specific impulse, ease of handling, and its lower tendency to produce combustion instability as compared to liquid oxidizers. Specifically, GOX-based hybrid rockets (rockets that combine a solid fuel with a liquid or gaseous oxidizer) are an attractive alternative to conventional liquid monopropellant (LMP) thrusters for in-space propulsion applications. Like a LMP system, a GOX-based hybrid has only one main fluid system. However, the GOX-based hybrid is simpler than the LMP system because it eliminates liquids and, therefore, does not require propellant management equipment such as diaphragms and helium pressurization. Its propellants, gaseous oxygen and a polymeric fuel such as high-density polyethylene (HDPE), are benign and more readily handled than the extremely toxic hydrazine monopropellants. Simplicity and improved handling are expected to reduce the cost of the hybrid to be below that of LMP systems. The hybrid also increases performance on a mass basis, with the high specific impulse of the bipropellant combination more than offsetting the mass penalty for storing a gaseous oxidizer.

However, the hybrid concept is deficient on a volume basis because of the low density GOX. The effective density impulse of a hydrazine LMP system is more than twice that of a GOX-based hybrid when the gaseous oxygen is stored at 2,000 psia. This effectively eliminates the GOX-based hybrid from consideration in volume-constrained applications, at least when low to moderate storage pressures are used. One possible solution is to increase the storage pressure, and the GOX-based hybrid density impulse begins to exceed hydrazine LMP above 6,000 psia. There are diminishing returns as real-gas effects become apparent, and extremely high-pressure oxygen raises safety concerns, particularly when employed on a secondary payload. Risk management of the primary payload, the launch vehicle, or other secondary payloads limits the usage of high-pressure oxygen in secondary payload applications. Therefore, a different approach is required to reduce the volume of GOX propulsion systems and enable their use in volume or safety constrained applications.

SUMMARY

A method for storing oxygen in a solid phase material for a rocket propulsion system. The method provides a solid-phase compound selected from the group consisting of alkali metal chlorates, alkali metal perchlorates or alkali metal peroxides and mixtures thereof followed by heating the solid phase compound and generating gaseous oxygen at a pressure of greater than or equal to 250 psia over a time period of 2.0 minutes or greater. The gaseous oxygen is then introduced into the rocket propulsion system. The alkali metal chlorate may comprise $M^+(ClO_3)^-$ wherein $M^+$ is selected from $Li^+$, $Na^+$ or $K^+$, the alkali metal perchlorates $M^+(ClO_4)^-$ wherein $M^+$ is selected from $Li^+$, $Na^+$ or $K^+$. The alkali metal peroxides may include $Li_2O_2$, $Na_2O_2$, or $K_2O_2$. One may also include a catalyst comprising a metal oxide, such as manganese oxide or chromium oxide.

DETAILED DESCRIPTION OF THE PREFERRED EMBODIMENTS

Figure 1:
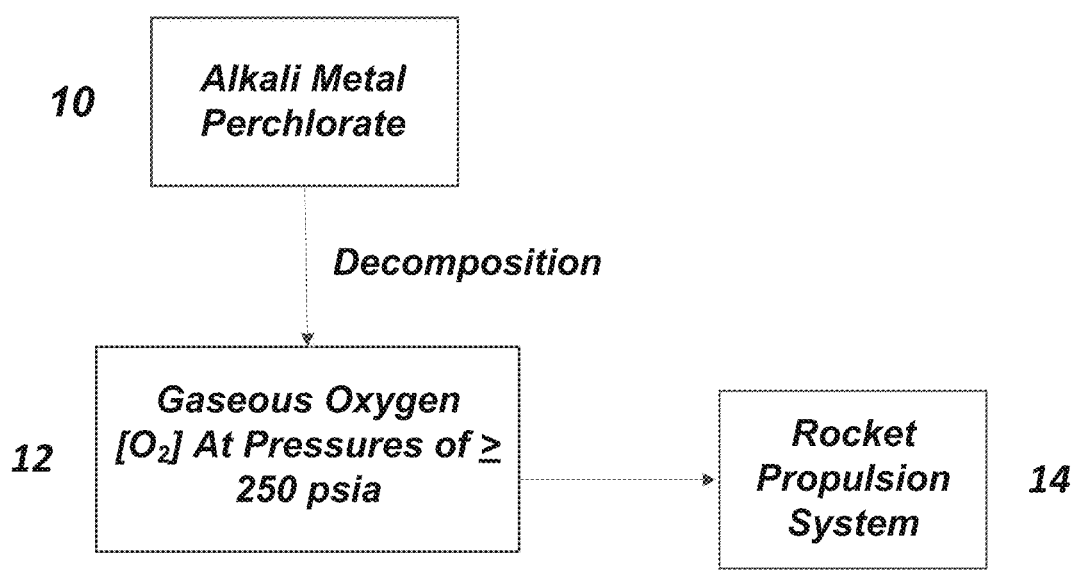
FIG. 1 illustrates the use of an alkali metal perchlorate in a gaseous oxygen hybrid propulsion system.

The present invention is directed at solid state oxygen storage for in-space propulsion systems. The solid state oxygen storage refers to solid-phase chemical compounds that are stable at standard temperature and pressure but which decompose to release oxygen at elevated temperatures. The released oxygen can then be combined with a separate fuel source for space-propulsion applications.

Preferably, the solid-phase chemical compounds are alkali metal perchlorates having the formula $M^+(ClO_4)^-$ or alkali metal chlorates having the formula $M^+(ClO_3)^-$, where M is selected from $Li^+$, $Na^+$, $K^+$, or mixtures thereof. Upon decomposition, the following occurs:

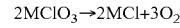

Table 1 below identifies the oxygen storage characteristics of the identified perchlorate compounds in comparison to gaseous and liquid oxygen:

TABLE 1

| Compound | Oxygen Mass Fraction | Oxygen Density kg/m³ | Decomposition Temperature, °C. |
|---|---|---|---|
| Lithium Perchlorate ($LiClO_4$) | 60% | 1,461 | 400 |
| Sodium Perchlorate ($NaClO_4$) | 52% | 1317 | 480 |
| Potassium Perchlorate ($KClO_4$) | 46% | 1,164 | 500 |
| Liquid Oxygen @ 14.7 psi | 100% | 1,141 | N/A |
| Gaseous Oxygen @ 10,000 psi | 100% | 668 | N/A |
| Gaseous Oxygen @ 1,000 psi | 100% | 92 | N/A |

As can be seen from the above, lithium, sodium and potassium perchlorate all provide excellent oxygen density. Lithium perchlorate provides the highest oxygen mass fraction, highest oxygen density and lowest decomposition temperature. Accordingly, lithium perchlorate is particularly well-suited herein for storing oxygen for a space propulsion application. In addition, it is worth noting that the decomposition of the alkali perchlorates, which is preceded by endothermic melting, is weakly exothermic, which is reference to an exothermic heat generation in the range of 7 kJ/mol to 28 kJ/mole. Accordingly, the alkali chlorates herein are such that they indicate an exothermic decomposition of ≤28 kJ/mole. The alkali perchlorates herein are therefore relatively safe to detonation making them particular suitable for the in-space propulsion applications described herein.

In addition to the alkali metal chlorates and alkali metal perchlorates that can be used for oxygen gas generation herein, one may also utilize an alkali metal peroxide ($Li_2O_2$; $Na_2O_2$, $K_2O_2$). Of these, preferably, one can utilize lithium peroxide. Upon heating and decomposition, oxygen gas generation proceeds according to the following general equation:

$$2Li_2O_2 \rightarrow 2Li_2O + O_2$$

It should also be noted that the alkali metal peroxide may be used on its own or in combination with the alkali metal chlorates and/or alkali metal perchlorates noted above. More specifically, one may utilize the alkali metal chlorate and/or alkali metal perchlorate at a molar ratio to the alkali metal peroxide of 1:1 to 3:1, More preferably, the molar ratio of alkali metal chlorate to alkali metal perchlorate to the alkali metal peroxide is 2:1.

FIG. 1 identifies the use of an alkali metal perchlorate in a gaseous oxygen hybrid propulsion system. As can be seen, the alkali metal perchlorate at 10 is configured to decompose at elevated temperature to produce gaseous oxygen. The alkali metal perchlorates, as well as the alkali metal chlorates or the alkali metal peroxides, are preferably present as particles with a particle size (longest linear diameter) in the range from 10 μm to 100 μm, more preferably 50 μm to 70 μm. The gaseous oxygen is introduced to a gaseous oxygen accumulator 12, which as shown, includes a vessel to store the oxygen gas under pressure for subsequent release to a rocket propulsion system 14. However, the oxygen accumulator herein may also include a supply line for direct feeding of gaseous oxygen into the rocket propulsion system. Moreover, the rocket propulsion system is understood herein as an engine that provides propulsion by expelling a reaction mass in accordance with Newton's third law of motion.

Preferably, the decomposition is such that oxygen pressures of greater than or equal to 250 psia are achieved (≥250 psia). More preferably, the oxygen pressures that are achieved are contemplated to fall in the range of ≥250 psia to 4000 psia. For example, the oxygen pressures that are achieved may also preferably be ≥500 psia, or ≥750 psia, or ≥1000 psia. Such pressures are also preferably achieved over a time period of 2.0 minutes or greater. Preferably such pressures are achieved in the range of 2.0 minutes to 60.0 minutes. More preferably, the time period is in the range of 2.0 minutes to 20 minutes or in the range of 2.0 minutes to 10.0 minutes. In addition, the alkali metal chlorate storage is such that, in discrete event fashion, it can replenish the accumulator volume several times over a given period of time at the required pressures of ≥250 psia, depending upon the requirements of the rocket propulsion system 14. In other words, the alkali metal storage is such that it can repeatedly recharge the accumulator to pressures of ≥250 psia to supply requisite levels of oxygen gas to the rocket propulsion system for in-space travel requirements. Alternatively, the alkali metal perchlorate decomposition may directly feed the rocket propulsion system 14 if prolonged burns are necessary in the rocket propulsion system.

As therefore noted, the gaseous oxygen is introduced into a rocket propulsion system 14 and combined with a fuel source. The rocket propulsion system is preferably a gaseous oxygen-hybrid system that relies upon the gaseous oxygen and a solid fuel. The solid fuel may include a polyethylene such as high-density polyethylene (HDPE), rubber (e.g. polybutadiene such as hydroxyl terminated polybutadiene). One may also utilize a paraffin containing 20-40 carbon atoms.

As noted above, the decomposition of the alkali metal perchlorate to promote oxygen gas formation occurs with heat. Such heat may be provided from electric resources, such as solar panels or batteries. Solar radiation may also be relied upon to directly heat the alkali metal perchlorate. It may also rely upon the separate reaction of pyrotechnic materials. In addition such heating may conveniently rely upon heat from the rocket propulsion system. For example, it is contemplated that heat from the rocket chamber or even heat generated from the output plume of the rocket may be utilized to provide the requisite heating for alkali metal perchlorate decomposition and oxygen gas generation.

It has also been identified herein that oxygen gas formation from the solid alkali metal perchlorate can be generated at different rates through the effect of catalysis. Specifically, one may use, in combination with the alkali metal perchlorate, a metal oxide. Such metal oxides can preferably include manganese oxide ($MnO_2$) or chromium oxide ($Cr_2O_3$). The mole ratio of the solid alkali perchlorate to the metal oxide is preferable in the range of 3:1 to 7:1, more preferably 4:1 to 6:1. In a most preferred embodiment, the mole ratio of the solid alkali perchlorate to the metal oxide is 5:1.

Figure 2:
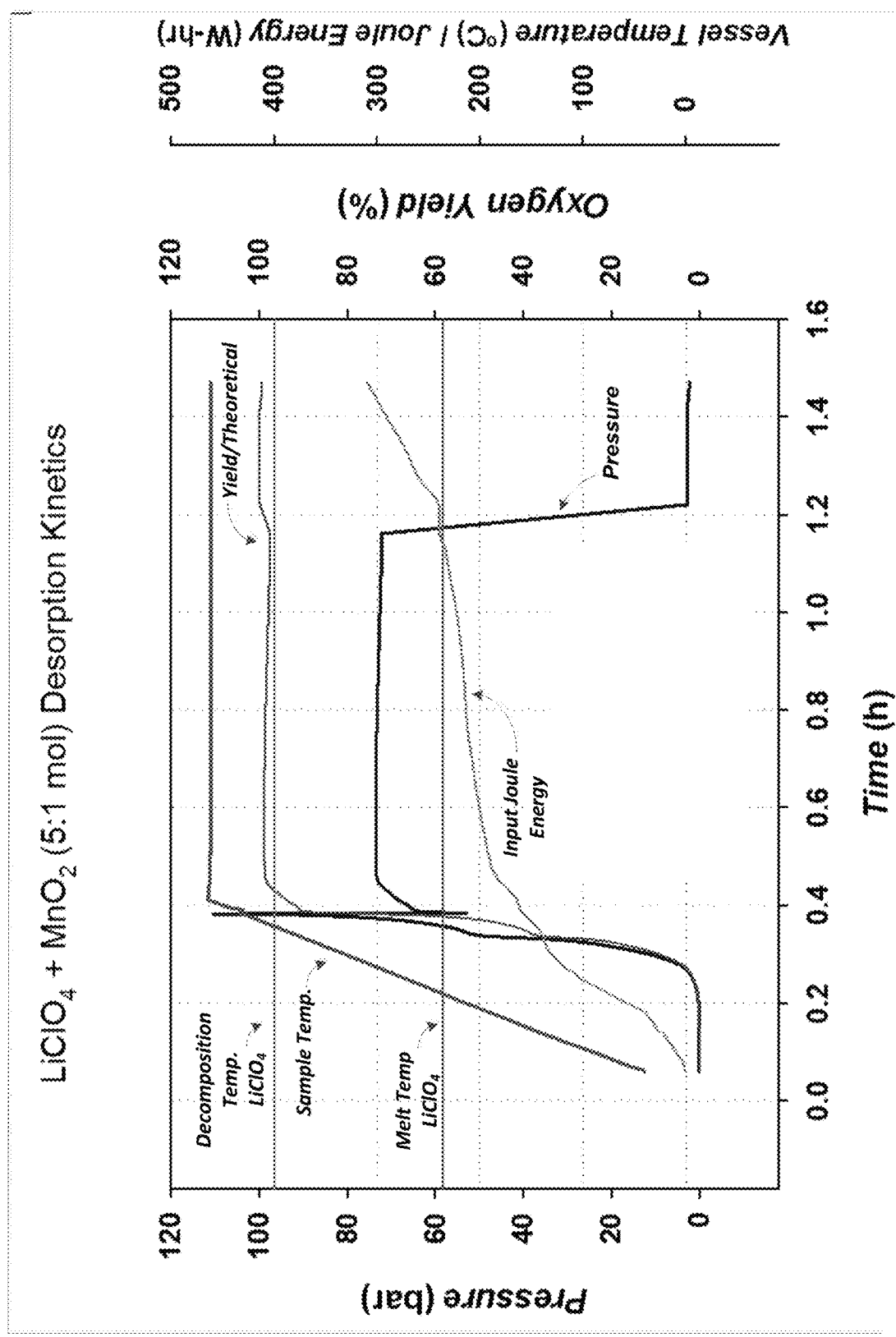
FIG. 2 identifies the pressure and oxygen yield versus time for the thermal decomposition of $LiClO_4$ in the presence of $MnO_2$ at a 5:1 mole ratio.
Figure 3:
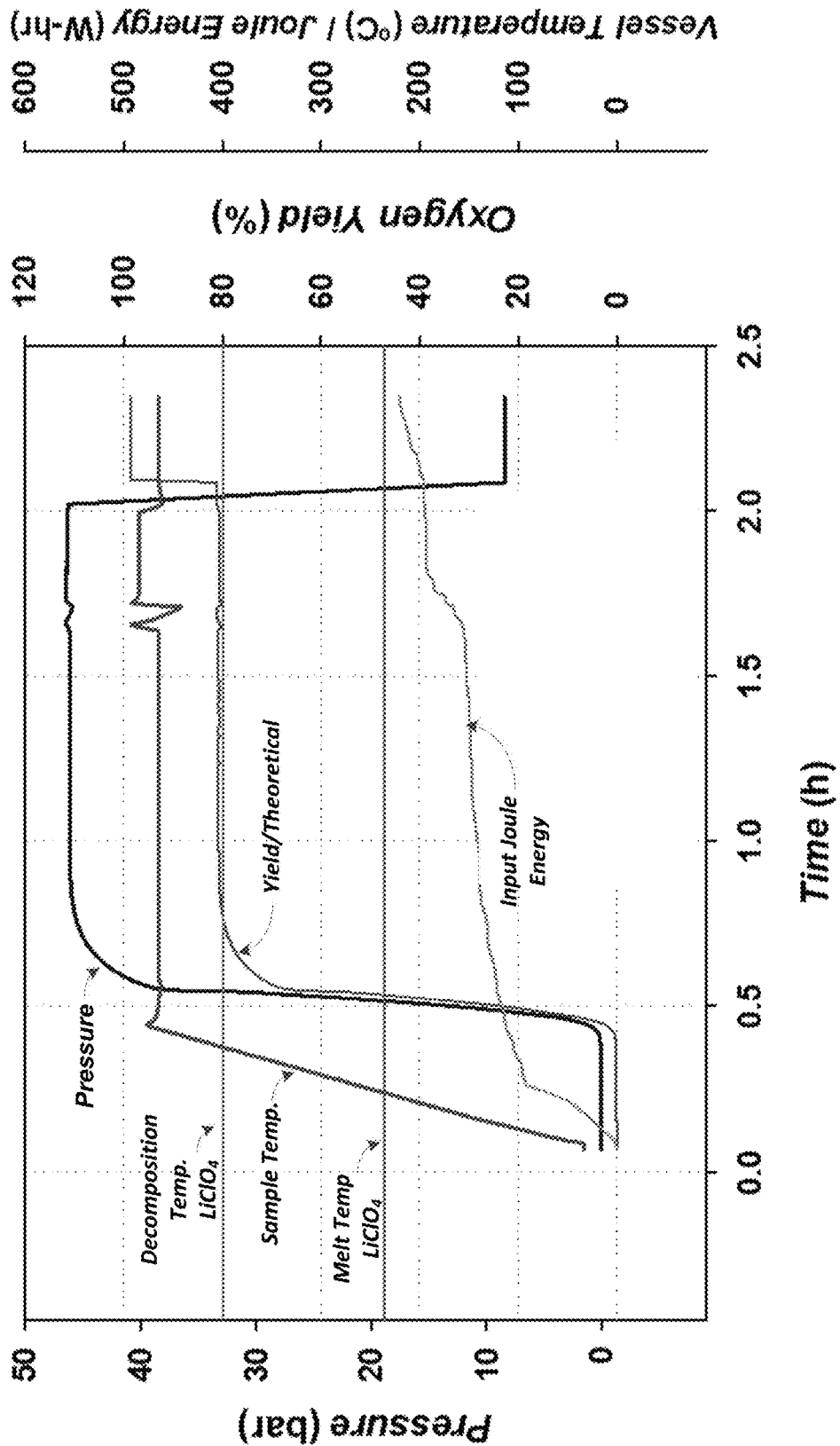
FIG. 3 illustrates the pressure and oxygen yield versus time profiles measured for the thermal decomposition of $LiClO_4$.

FIG. 2 identifies the pressure and oxygen yield versus time for the thermal decomposition of $LiClO_4$ in the presence of $MnO_2$ at a 5:1 mole ratio. This plot is overlaid with the profiles for the vessel temperature and the integrated Joule heating (right ordinate), which corresponds to the measured energy input supplied to the heating element of the test vessel to attain the thermal profile. In this case, the pressure rise from the catalytic evolution of oxygen occurred at such a relatively high rate that the monitoring system for the volumetric analyzer employed automatically increased the volume of the calibrated reservoir volume (4.61→11.47 cm³) to avoid over-pressurizing of the system. This event was reflected by the spike in the pressure profile at 0.4 hours. The computed oxygen yields beyond this time point were corrected for the larger reservoir volume. As can also be seen, the first steady-state plateau was attained within about 26 minutes from the start of the heating curve and within only a few minutes after attaining isothermal conditions at around 460° C. By contrast to pure $LiClO_4$, the decomposition reaction nearly achieved the theoretical yield for oxygen within the first aliquot (~99%). Additionally, a marked decrease (Δ75° C.) in the temperature range of which significant oxygen generation occurs was realized with $MnO_2$ as a catalyst in combination with $LiClO_4$, as opposed to the use of $LiClO_4$ on its own. Reference is therefore made to FIG. 3 which provides the pressure and oxygen yield versus time profiles measured for the thermal decomposition of $LiClO_4$. Steady-state conditions were achieved after approximately on hour, or within 30 minutes after attaining isothermal conditions at 460° C.

Figure 4:
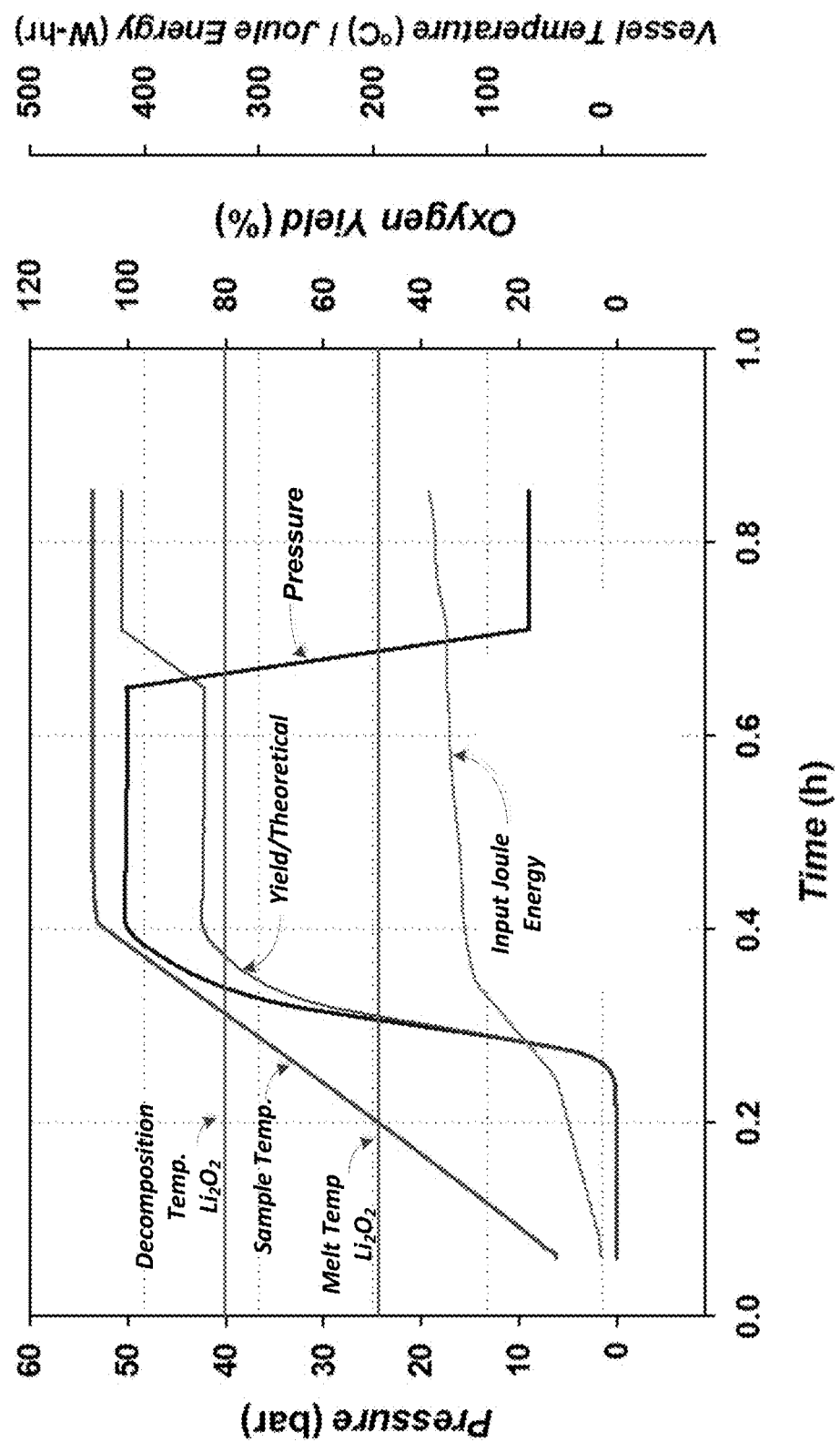
FIG. 4 illustrates the pressure and oxygen yield versus time profiles measured for the thermal decomposition of $Li_2O_2$.
Figure 5:
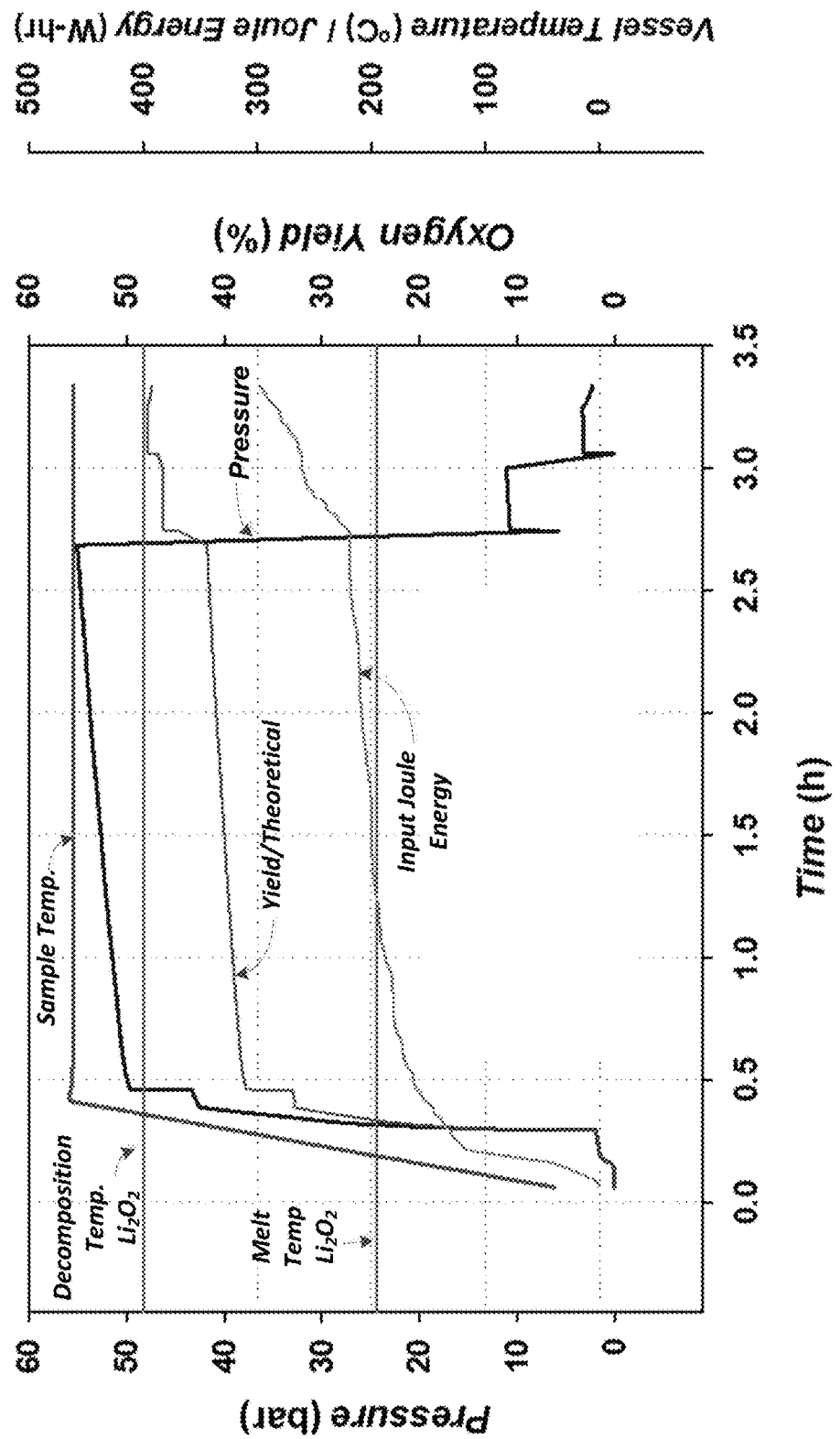
FIG. 5 illustrates the pressure and oxygen yield versus time profiles measured for the thermal decomposition of $LiClO_4$ in the presence of $Li_2O_2$ at a 2:1 mole ratio.

Attention is next directed to FIG. 4 which provides the pressure and oxygen yield versus time profiles measured for the thermal decomposition of $Li_2O_2$. As can be seen in FIG. 4, the first steady-state plateau was attained in about 30 minutes from the start of the heating curve and within a few minutes after obtaining isothermal conditions at 450° C. The oxygen yield at the first plateau was ~84% at 50 bar. Complete decomposition and oxygen yield was then achieved. FIG. 5 provides the pressure and oxygen yield versus time profiles measured for the thermal decomposition of $LiClO_4$ in the presence of $Li_2O_2$ at a 2:1 mole ratio.

Table 2 below provides a summary of the preferred solid-phase chemical oxygen generating compounds and exemplary formulations. The mole ratios for the formulations recite the catalysts $MnO_2$ and $Cr_2O_3$ and are based on the number of cations in each oxide. The theoretical yields for these formulations assume the metal oxide is reduced to yield 0.5 moles of oxygen:

TABLE 2

| Compound/Formulation | MW (g/mol) | Content (wt. % Oxygen) | Bulk Density (g/cm³) | Tm (° C.) | Decomposition Temp. (° C.) | Total Analysis Weight (g) | Theoretical Yield (mol O₂) |
|---|---|---|---|---|---|---|---|
| LiClO₄ | 106.39 | 60.15 | 2.420 | 236 | 400 | 2.5543 | 0.0480 |
| Li₂O₂ | 45.88 | 34.87 | 2.310 | 195 | 330 | 3.5235 | 0.0384 |
| LiClO₄ + Li₂O₂* (2:1 mol) | | 55.67 | | | | 5.0242 | 0.0825 |
| LiClO₄ + MnO₂* (5:1 mol) | 86.94 | 54.29 | 5.030 | 535 | 483 | 5.9969 | 0.1018 |
| LiClO4 + Cr₂O₃* (5:1 mol) | 151.99 | 49.12 | 5.220 | 2,435 | 1,200 | 6.0290 | 0.1014 |

For mixtures, the molecular weight, bulk density, melting point and decomposition temperatures are given for the component not previously listed in the table, if applicable. Thus, these fields are blank for LiClO₄+Li₂O₂ entry and give the values for MnO₂ in the LiClO₄+MnO₂ entry.

As can now be appreciated, the invention herein is particular beneficial to hybrid rockets systems where the fuel is already stored in the solid phase. Storing the oxygen in the solid phase and generating gaseous oxygen on-demand facilitates a liquid-free propulsion system that is contemplated to be relatively safe, compact and capable of a plurality of restarts, all with throttling. The system herein is therefore further contemplated to be denser and more environmentally friendly than existing hydrazine monopropellant thrusters while achieving a similar mass.

What is claimed is:

1. A method for providing oxygen for a rocket propulsion system comprising:
   providing a solid phase composition comprising a solid phase metal oxide and a solid phase compound, wherein said solid phase compound is selected from the group consisting of alkali metal chlorates, alkali metal perchlorates or alkali metal peroxides and mixtures thereof and a mole ratio of said solid phase compound to said solid phase metal oxide is in a range of 3:1 to 6:1;
   heating said solid phase composition and generating gaseous oxygen at a pressure of greater than or equal to 250 psia over a time period of 2.0 minutes or greater and introducing said gaseous oxygen to an accumulator of said rocket propulsion system.

2. The method of claim 1 wherein said pressure of said oxygen gas in said accumulator is greater than or equal to 250 psia to 4000 psia.

3. The method of claim 1 wherein said time period for generation of said oxygen gas is 2.0 minutes to 60.0 minutes.

4. The method of claim 1 wherein heating said solid phase composition comprises utilizing heat from said rocket propulsion system to heat said solid phase composition.

5. The method of claim 1 wherein said alkali metal chlorate comprises $M^+(ClO_3)^-$ wherein $M^+$ is selected from $Li^+$, $Na^+$ or $K^+$.

6. The method of claim 1 wherein said alkali metal perchlorate comprises $M^+(ClO_4)^-$ wherein $M^+$ is selected from $Li^+$, $Na^+$ or $K^+$.

7. The method of claim 1 wherein said alkali metal peroxide comprises $Li_2O_2$, $Na_2O_2$, or $K_2O_2$.

8. The method of claim 1 wherein said solid phase metal oxide comprises manganese oxide or chromium oxide.

9. The method of claim 1 wherein said solid phase compound comprises an alkali metal perchlorate.

10. The method of claim 9 wherein said mole ratio is 4:1 to 6:1.

11. The method of claim 9 wherein said alkali metal perchlorate comprises $LiClO_4$ and said metal oxide comprises $MnO_2$.

12. The method of claim 1 wherein said solid phase compound is comprises particles with a particle size ranging from 10 μm to 100 μm.

13. The method of claim 11 wherein a mole ratio of said $LiClO_4$ to said $MnO_2$ is in a range of 4:1 to 6:1.

14. The method of claim 13 wherein said alkali metal perchlorate comprises particles with a size ranging from 10 μm to 100 μm.

* * * * *